USO10565619B2

(12) United States Patent
McDevitt et al.

(10) Patent No.: US 10,565,619 B2
(45) Date of Patent: Feb. 18, 2020

(54) SYSTEMS AND METHODS FOR ENABLING ACCESS TO DIGITAL CONTENT BASED ON GEOGRAPHIC LOCATIONS VISITED BY MOBILE DEVICE USERS

(71) Applicant: AOL Inc., Dulles, VA (US)

(72) Inventors: Patrick McDevitt, Hanover, NH (US); Joseph Hughes, Lancaster, PA (US); Jon Szymanski, Severna Park, MD (US)

(73) Assignee: Oath Inc., Dulles, VA (US)

( * ) Notice: Subject to any disclaimer, the term of this patent is extended or adjusted under 35 U.S.C. 154(b) by 927 days.

(21) Appl. No.: 14/322,313

(22) Filed: Jul. 2, 2014

(65) Prior Publication Data
US 2016/0005077 A1 Jan. 7, 2016

(51) Int. Cl.
G06Q 30/00 (2012.01)
G06Q 30/02 (2012.01)
H04W 4/021 (2018.01)

(52) U.S. Cl.
CPC ........ G06Q 30/0261 (2013.01); H04W 4/021 (2013.01); G06Q 30/0226 (2013.01); G06Q 30/0233 (2013.01)

(58) Field of Classification Search
CPC ................................................ G06Q 30/0261
See application file for complete search history.

(56) References Cited

U.S. PATENT DOCUMENTS 8,965,988 B1 * 2/2015 Negahban ............... H04W 4/90
709/206
10,257,291 B1 * 4/2019 Matiash .................. H04L 67/18
(Continued)

FOREIGN PATENT DOCUMENTS

AU 2013274398 A1 * 1/2015

OTHER PUBLICATIONS

Christin, Delphine, Pablo Sánchez López, Andreas Reinhardt, Matthias Hollick, and Michaela Kauer. "Share with Strangers: Privacy Bubbles as User-Centered Privacy Control for Mobile Content Sharing Applications." Information Security Technical Report 17, No. 3 (Feb. 1, 2013): 105-16 (Year: 2013).*

(Continued)

Primary Examiner — Michael Bekerman
Assistant Examiner — Scott Snider
(74) Attorney, Agent, or Firm — Bookoff McAndrews, PLLC

(57) ABSTRACT

Systems and methods are provided for enabling access to digital content based on geographic locations visited by mobile device users. One method includes receiving a promotion associated with premium digital content, access information, and one or more locations in which the premium digital content is accessible. The premium digital content includes restricted access content and the premium digital content is associated with open access content, determining one or more geo-fences based on the one or more locations, transmitting at least part of the promotion to one or more mobile devices, receiving a geographic location of the one or more mobile devices, determining whether the geographic location of the one or more mobile devices is within at least one of the one or more geo-fences, and transmitting, when the geographic location of the one or more mobile devices is determined to be within the one or more geo-fences, access information for the premium digital content to the one or more mobile devices within the one or more geo-fences.

20 Claims, 11 Drawing Sheets

(56) References Cited

U.S. PATENT DOCUMENTS

| | | | |
|---|---|---|---|
| 2003/0023578 A1* | 1/2003 | Durand | G06F 21/10 |
| 2007/0174259 A1* | 7/2007 | Amjadi | G06F 17/30864 |
| 2012/0116863 A1* | 5/2012 | Boss | G06Q 30/0235 |
| | | | 705/14.35 |
| 2013/0054422 A1* | 2/2013 | DeSouza | G06Q 30/00 |
| | | | 705/27.1 |
| 2013/0143586 A1* | 6/2013 | Williams | G06Q 30/0261 |
| | | | 455/456.1 |
| 2014/0282192 A1* | 9/2014 | Grossman | G06F 16/285 |
| | | | 715/771 |
| 2015/0012344 A1* | 1/2015 | Guinn | G06Q 30/0209 |
| | | | 705/14.12 |
| 2015/0120455 A1* | 4/2015 | McDevitt | G06Q 30/0261 |
| | | | 705/14.58 |
| 2017/0178174 A1* | 6/2017 | Mitchell | G06Q 30/0233 |

OTHER PUBLICATIONS

European Patent Office Extended Search Report issued in corresponding European Application No. 15175111.2, dated Nov. 27, 2015.

* cited by examiner

SYSTEMS AND METHODS FOR ENABLING ACCESS TO DIGITAL CONTENT BASED ON GEOGRAPHIC LOCATIONS VISITED BY MOBILE DEVICE USERS

TECHNICAL FIELD

The present disclosure relates generally to systems and methods for enabling access to digital content based on geographic locations visited by mobile device users and, more particularly, to providing and/or modifying access to digital content available at or within certain physical locations based on one or more conditions.

BACKGROUND

Promotions are marketing and advertising tools used to promote products and/or services. Promotions are typically employed to increase sales and/or consumer traffic. Promotions are often used to drive traffic to "brick and mortar" stores. Promotions may include coupons to obtain discounts on certain products, such as a percentage discount or "buy-one"-type discounts. One assumption is that consumers who take advantage of such promotions may also purchase additional items during the visit to a retail store, and/or may be more likely to make future visits to the retail store. Traditionally, these promotions are limited to promoting items and/or services of the retailer sponsoring the promotion. Specifically, retailers have traditionally been limited to offering discounts to their own products and/or services in order to entice users to visit their locations.

Some attempts have been made at cross-promoting products and brands of various companies. For example, a fast food chain might contract with a movie studio to cross-promote a particular movie in relation to the chain's fast food products. However, such promotions involve significant advanced planning and agreement, and preparation of physical signage and packaging. Moreover, such cross-promotions are often static, ineffective at driving consumer behavior, and difficult or even impossible to modify and/or evaluate based on real-time performance of the cross-promotion.

Recent advancements in electronic technology, ranging from personal computers to smart phones, now allow for promotions relating to digital content of digital content providers. The promotions for digital content may be delivered to consumers by a variety of means including e-mail, SMS messages, and/or client applications. For example, promotions of digital content include sending users mobile advertisements, such as by displaying a movie trailer to a user before enabling the user to view another video clip of interest. Meanwhile, promotion of retailers has also entered the digital and mobile realm. For example, a mobile device user may now be presented with a banner advertisement, such as for a "brick-and-mortar" retailer, adjacent to electronic content, such as a news article or blog entry, that a user desires to view.

Even when optimized with digital and mobile technologies, these existing techniques have significant limitations. For example, the promotion of digital content, such as a movie trailer or video ad, is often only displayed while the user is instead attempting to access different content of interest. As a result, some users may experience frustration with the promoted digital content, and may be inclined to skip or ignore the digital content, or even begrudge its provider for delaying access to the desired content. Meanwhile, the promotion of a brick-and-mortar store, such as through an ad displayed next to an article, may be too inconspicuous and therefore too ineffective to actually drive the user's contemporaneous or near-term behavior. For example, retailers may be doubtful about the likelihood of a user actually visiting a physical retailer upon seeing its advertisement adjacent to other content. Still further, retailers and third party advertising networks may have no way to determine whether an advertisement led directly, i.e., caused, a user to visit a retail location.

Thus, conventional solutions related to promotions have failed to solve the above-mentioned limitations, and have not provided a solution for promotions that promote both a retailer and digital content in ways that improve the user experience with both retailers and digital content.

SUMMARY OF THE DISCLOSURE

Embodiments of the present disclosure include systems and methods for enabling access to digital content based on geographic locations visited by mobile device users. In certain embodiments, methods are disclosed for enabling access to digital content based on geographic locations visited by mobile device users. One method includes receiving a promotion associated with access to premium digital content and access information for the premium digital content, the promotion including one or more locations in which the premium digital content is accessible, wherein the premium digital content includes restricted access content and the premium digital content is associated with open access content; determining one or more geo-fences based on the one or more locations in which the premium digital content is accessible; transmitting at least part of the promotion to one or more mobile devices; receiving a geographic location of the one or more mobile devices; determining whether the geographic location of the one or more mobile devices is within at least one of the one or more geo-fences; and transmitting, when the geographic location of the one or more mobile devices is determined to be within the one or more geo-fences, access information for the premium digital content to the one or more mobile devices within the one or more geo-fences.

According to certain embodiments, systems are disclosed for enabling access to digital content based on geographic locations visited by mobile device users. One system includes a memory having processor-readable instructions stored therein; and a processor configured to access the memory and execute the processor-readable instructions, which when executed by the processor configures the processor to perform a plurality of functions, including functions to: receive a promotion associated with access to premium digital content and access information for the premium digital content, the promotion including one or more locations in which the premium digital content is accessible, wherein the premium digital content includes restricted access content and the premium digital content is associated with open access content; determine one or more geo-fences based on the one or more locations in which the premium digital content is accessible; transmit at least part of the promotion to one or more mobile devices; receive a geographic location of the one or more mobile devices; determine whether the geographic location of the one or more mobile devices is within at least one of the one or more geo-fences; and transmit, when the geographic location of the one or more mobile devices is determined to be within the one or more geo-fences, access information for the premium digital content to the one or more mobile devices within the one or more geo-fences.

According to certain embodiments, a computer readable medium is disclosed as storing instructions that, when executed by a computer, cause the computer to perform functions to: receive a promotion associated with access to premium digital content and access information for the premium digital content, the promotion including one or more locations in which the premium digital content is accessible, wherein the premium digital content includes restricted access content and the premium digital content is associated with open access content; determine one or more geo-fences based on the one or more locations in which the premium digital content is accessible; transmit at least part of the promotion to one or more mobile devices; receive a geographic location of the one or more mobile devices; determine whether the geographic location of the one or more mobile devices is within at least one of the one or more geo-fences; and transmit, when the geographic location of the one or more mobile devices is determined to be within the one or more geo-fences, access information for the premium digital content to the one or more mobile devices within the one or more geo-fences.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Digital content may be used to entice consumers to physically visit a commercial establishment and spend money. In order to access the digital content, a mobile device user may visit a physical location of the commercial establishment associated with digital content. The particular digital content that is accessible to a mobile device user may also depend on a particular location visited and/or on a task and/or condition that the mobile device user completes and/or satisfies. Conventional solutions do not provide ways for enabling access to digital content based on geographic locations visited by mobile device users, much less, making such access dependent upon one or more tasks being completed.

The present disclosure is directed to overcoming one or more of the above referenced issues. Specifically, the present disclosure is directed to enabling access to digital content based on geographic locations visited by mobile device users. In order to entice mobile device users through digital content, any such digital content, including but not limited to: an advertisement, a notification, a message, a coupon, and/or initial digital content may be delivered to and/or received by the mobile device user to promote access that is limited but available in one or more geographical locations. For example, an advertisement may include a message that if the user visits one of the retail locations of, for example, a particular brand of coffee shop, the user may be granted access to download a mobile application, that is normally a paid application, for free. The advertisement, notification, message, coupon, and/or initial digital content may be electronically delivered to and/or received by a mobile device through, for example, a link, e-mail, in-app push notification, banner advertisement presented on a website, a graphical user interface ("GUI") of a client application, or other any other ways of electronically delivering digital content to a mobile device user.

Figure 1C:
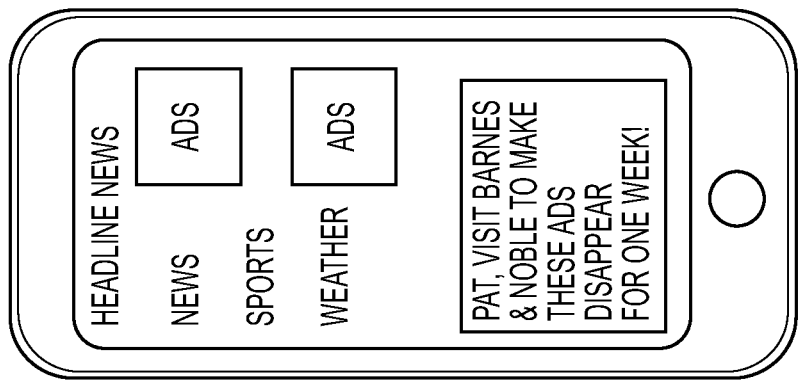
FIGS. 1A, 1B, 1C, 1D, and 1E depict wireframe screenshots of exemplary promotions displayed on a mobile device, in accordance with an embodiment of the present disclosure.
Figure 1B:
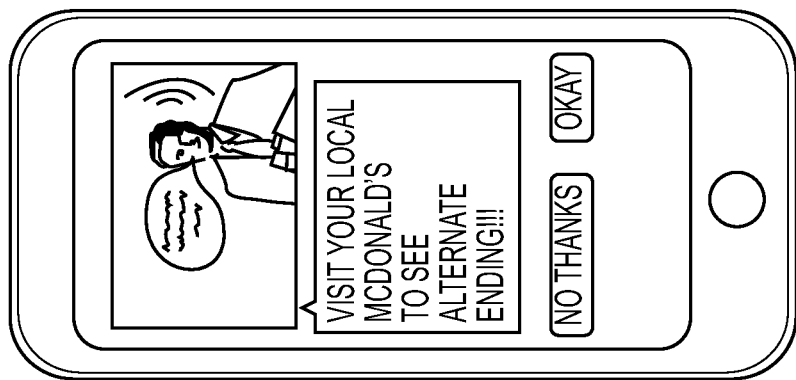
Figure 1A:
Figure 1E:
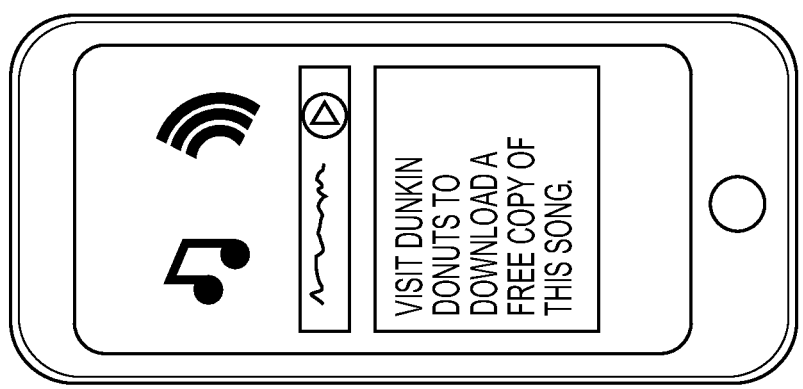
Figure 1D:
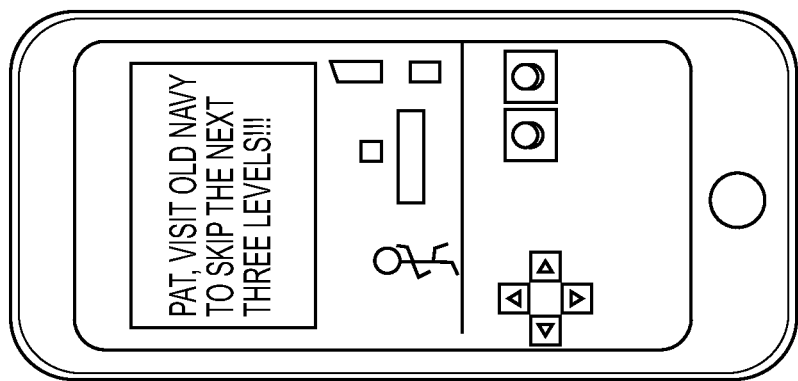

The digital content used to entice a mobile device user to one or more locations may be one or more of: access to and/or download of paid applications made available for free, and/or limited time/location access to restricted premium digital content (FIG. 1A); access to alternative versions, cuts, and/or endings of digital video content (FIG. 1B); access to advertisement-free digital content (FIG. 1C); access to one or more types of video game perks (FIG. 1D); and/or access to and/or download privileges to electronic files, such as articles, e-books, and songs (FIG. 1E). Thus, the digital content or preview may be an advertisement to obtain access to: movies, trailers, e-books, e-magazines, e-coupons, e-discounts, e-tickets, and/or video games, among any other type of electronic or digital content that may be desired by any type of mobile device user.

In certain embodiments, one or more locations may be associated with the grant of access to the digital content. The one or more locations may be, for example, a predetermined geographic area of any size and shape, e.g., as determined by the promoter. The bounds of the geographic area may be defined by, for example, a customized geo-fence or virtual perimeter surrounding a physical store, a predetermined radius around the store, an entire shopping center the store is located within, and/or the store's parking lot. It should be noted that a location associated with the digital content and its corresponding geo-fence is not limited to stores, but can be created with respect to any establishment, including, but not limited to: restaurants, hotels, event venues, and so on. As with all geo-fences, each geo-fence may be an invisible, virtual perimeter associated with a real-world geographic location of any size or shape, and the extent of which may or may not be explicitly displayed or viewable.

As discussed above, in some embodiments, access to the digital content may be limited until the current location of the mobile device of the user is within a geo-fence associated with the digital content. Access to the digital content may also be dependent on the prior completion of one or more tasks, and/or the satisfaction of one or more conditions. The one or more tasks and/or conditions may be to visit the one or more locations (i) at a particular time of day, (ii) at a particular day or days of the week, (iii) on a week day, (iv) on a weekend, (v) a number of times, and/or (vi) a number of times in a day, week, a month, or a year.

Additionally, the one or more tasks and/or conditions may be to visit at least two of the one or more locations; to visit the one or more locations in a particular order; and/or to visit one or more locations of a particular brand or chain, such as a Starbucks location, and to visit one or more locations of another brand or chain, such as a McDonald's location. By way of example, access to the digital content may involve the user visiting at least a particular bookstore chain and a particular coffee shop chain within a 12 hour period. At each of the locations visited, the mobile device user may receive digital content and/or instructions on where to visit next.

Further, the one or more tasks and/or conditions may be to visit the one or more locations for a predetermined amount of time; to visit a particular location of the one or more locations for a predetermined amount of time; to remain in the one or more locations for a predetermined amount of time; and/or to remain in a particular location of the one or more locations for a predetermined amount of time.

The one or more tasks and/or conditions may be for the mobile device user to buy an item at the one or more locations, to buy an item at a particular location, and/or to buy an item online. The one or more tasks and/or conditions may be for the mobile device user to (i) download an application on the mobile device, (ii) watch a trailer and/or an advertisement on the mobile device, (iii) post to a social media web site, (iv) achieve a high score on video game on the mobile device, (v) provide personal information, and/or (vi) open an application on the mobile device.

In one embodiment of the present application, one or more servers may receive an advertisement, a notification, a message, a coupon, and/or initial digital content associated with digital content that is accessible at one or more locations, and receive the one or more locations associated with the digital content. The one or more servers may also receive access information for the digital content and/or receive the digital content. One or more geo-fences may be determined based on the received one or more locations. The advertisement, the notification, the message, the coupon, and/or the initial digital content (also referred to as promotion) may then be sent to one or more mobile device users.

In some cases, the received digital content, location(s), geo-fence(s), condition(s), etc. may be set by and received from an owner or promoter of the digital content. In other cases, the received digital content, location(s), geo-fence(s), condition(s), etc. may be set by and received from an owner or promoter of a retailer or other business affiliated with the location(s). In still further cases, the received digital content, location(s), geo-fence(s), condition(s), etc. may be set by any combination of and/or partnership between the owner or promoter of the digital content, the owner or promoter of the retailer, and an advertising and/or mapping network operating the systems and methods disclosed herein.

Once a mobile device user receives at least part of the promotion, the promotion and/or one or more servers may provide the mobile device user with the one or more locations associated with the digital content (FIGS. 1A-1E). For example, the promotion may explain that the digital content will only be accessible from certain locations. For instance, the promotion may provide a message that includes "Visit any one of company X's locations to receive a free song." The one or more locations associated with digital content may be, among other things, any commercial establishment, including, but not limited to, restaurants, stores, and event venues. The promotion may provide a link to a website listing all of the locations associated with the digital content so the mobile device user may determine the location he or she wishes to visit. The promotion and/or one or more servers may provide a list of locations closest to the current location of the mobile device user or, if such information is known, a location associated with the mobile device user, such as a mailing or billing address, a location the mobile device frequents, or a location the mobile device spends above a threshold amount of time.

The promotion may indicate that the digital content may not be accessible until the mobile device user completes one or more tasks and/or one or more conditions are fulfilled. Alternatively, or additionally, a representation of the promotion may also indicate that if the mobile device user completes a predetermined number of tasks and/or conditions, the digital content may be modified, enhanced, and/or available for a longer period of time to further entice the mobile device user to visit the subject location(s).

Once at least part of the promotion is provided by the one or more servers to one or more mobile devices (FIGS. 1A-1E), the one or more servers may receive location information from one or more mobile devices that received the promotion. If the current location of the mobile device is determined to be within a geo-fence associated with the digital content, then the digital content may become accessible to the mobile device user, in some cases without further action by the user (e.g., solely by virtue of location presence), and in other cases upon further action by the user (e.g., selecting a user element or making a post or message). This may be done by push-notifications, text message, e-mail, or other means.

Alternatively, or additionally, one or more tasks and/or conditions may have to be completed to make the digital content accessible. Once the mobile device user completes the one or more tasks and/or conditions, the one or more servers may then receive the current geographic location of the mobile device. If the geographic location of the mobile device is within a geo-fence associated with the digital content, the digital content may become accessible. As with the above example, the consumer can gain access to the digital content by push-notifications, text message, e-mail, or other methods.

In some circumstances, the one or more servers may not have access to the current location of the mobile device. In these situations, the one or more servers may request access to the location of the mobile device at any time including, but not limited to, when the promotion is transmitted, or when the mobile device user attempts to perform one or more tasks and/or conditions, as described above. For example, if the mobile device user attempts to post the promotion to a social media website, and the one or more servers cannot determine if the mobile device is within a geo-fence associated with the digital content, a message may be sent to the mobile device user to prompt him or her to allow the one or more servers to access the current location of the mobile device.

If the consumer attempts to complete the one or more tasks and/or conditions, and the one or more servers determines that the current location of the mobile device is not within a geo-fence associated with the coupon, a message can be sent prompting the mobile device user to visit a specified location. This message can also include a link to all participating locations. The message can also include the address of and directions to the participating location(s) closest to the current location of the mobile device or participating location(s) closest to an address associated with the consumer (e.g., mailing or billing address).

If, by continuously receiving and/or requesting an update of the current location of the mobile device, and/or after one or more tasks and/or conditions are completed, the one or more servers determines that the current location of the mobile device is within a geo-fence associated with digital content, the digital content may become accessible and/or the digital content may be transmitted to the mobile device. Thus, as described in more detail below, various tasks/conditions, locations, advertisements, and digital content may be used to entice mobile device users to physically visit certain physical locations.

Reference will now be made in detail to the exemplary embodiments of the disclosure, examples of which are illustrated in the accompanying drawings. Wherever possible, the same reference numbers will be used throughout the drawings to refer to the same or like parts.

Figure 1F:
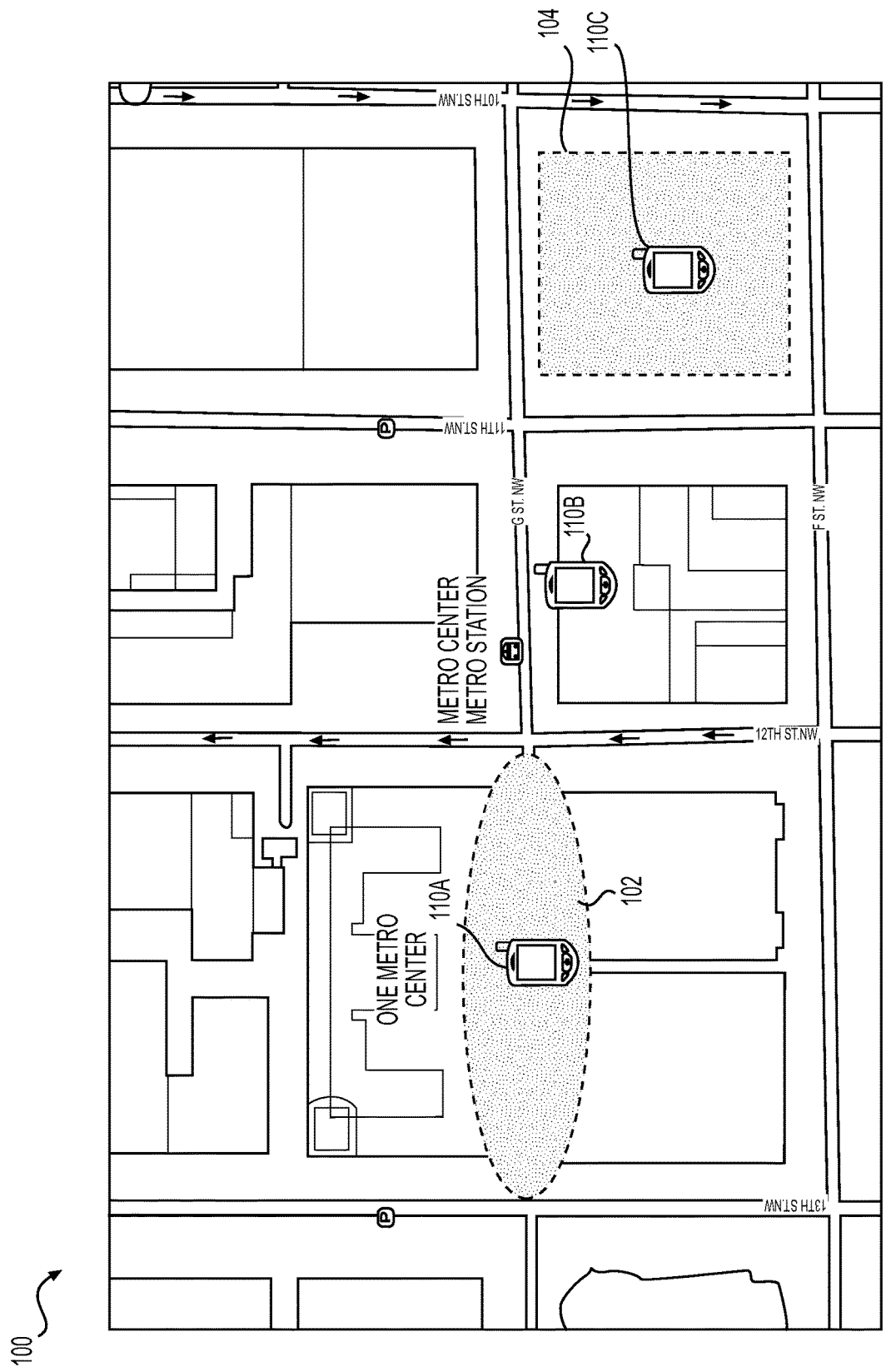
FIG. 1F is a top view of a map depicting multiple geo-fenced areas associated with geographic locations, certain digital content, and mobile devices, in accordance with an embodiment of the present disclosure.

FIG. 1F is a view of a map 100 showing a plurality of geo-fenced areas that allow access to certain digital content. As shown in FIG. 1F, map 100 includes a geo-fenced area 102 and a geo-fenced area 104. These geo-fenced areas 102 and 104 may be in existence for any amount of time suitable for an advertiser's needs. The geo-fenced areas may, for example, be permanent. Alternatively, the geo-fenced areas may be temporary (e.g. in existence for a limited period of time, or only certain hours of the day).

In one example, the area may be encircle or otherwise encompass a particular business. In another example, the area may be a restaurant that desires to increase business, e.g., lunch traffic on weekdays. This area might not involve a geo-fence activating at all times, but rather during only certain hours, e.g., only from the hours of, e.g., 11 am until 2 pm, Monday through Friday.

The boundaries or dimensions of each of the geo-fenced areas 102 and 104 may correspond to, for example, the shape and size of a building or other physical space associated with the digital content (e.g., a restaurant, store, concert venue, park, or any other area desired to be associated with access to digital content). The size and shape of each geo-fenced area may be any combination of the surface area of a building or other physical space, a predetermined radius around the building or physical space, an area within a building or structure, such as a store within a shopping center or a waiting area within an airport, and/or a building and a parking lot near the building.

Also, as shown in FIG. 1F, map 100 indicates the geographic locations of a mobile device 110A, a mobile device 110B, and a mobile device 110C. Each of mobile devices 110A, 110B, and 110C may be implemented using, for example, any type of mobile computing device including, but not limited to, a laptop computer, tablet computer, mobile handset, smartphone, personal digital assistant (PDA), a dedicated portable Global Positioning System (GPS) navigation device, or similar type of mobile device. Further, each of mobile devices 110A, 110B, and 110C may be equipped with a GPS receiver or equivalent for registering GPS location data, e.g., latitude and longitude coordinates, at a particular point or over a period of time. However, it should be noted that the physical or geographic location of each of mobile devices 110A, 110B, and 110C may be determined or estimated using any one or a combination of various well-known techniques for deriving such geographic location information. Examples of such techniques include, but are not limited to, GPS, cell identification (e.g., using Cell ID), cellular tower triangulation, multilateration, Wi-Fi, and any other network or handset based technique for deriving or estimating the physical or geographic location of a mobile device via a mobile communication network.

Each of mobile devices 110A, 110B, and 110C may be configured to receive, display, activate, redeem, and/or run digital content, such as coupons, video games, applications, movies, music, etc., in any desired way including but not limited to, downloading digital content, scanning digital content from printed material, accessing an e-mail or a website containing digital content, or executing a client application containing digital content. In one implementation, digital content may be delivered and displayed via a client application executable at each of mobile devices 110A, 110B, and 110C.

Each of mobile devices 110A, 110B, and 110C may be configured to receive a message notification and/or an advertisement that describes where the digital content may be accessed. The digital content may become permanently accessible when the mobile device is within a geo-fence associated with the digital content (e.g., geo-fences 102 and 104), may become accessible only when the mobile device is within a geo-fence associated with the digital content, may adjust when the mobile device is within a geo-fence associated with the digital content, and/or may adjust only when the mobile device is within a geo-fence associated with the digital content.

Figure 2:
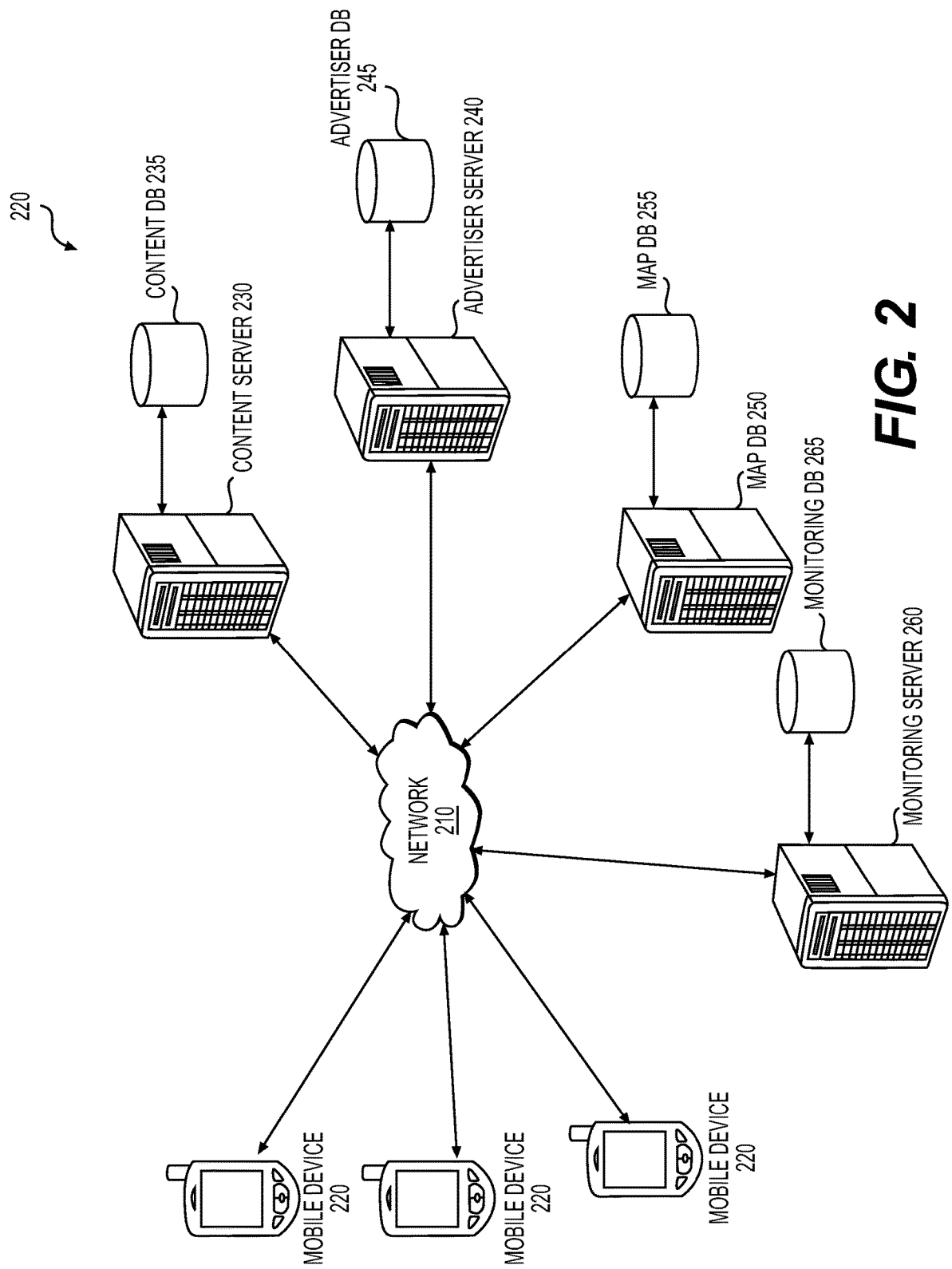
FIG. 2 is a block diagram of an exemplary communication system suitable for practicing an embodiment of the present disclosure.

The message notification and/or advertisement may be sent to each of mobile devices 110A, 110B, and 110C by an advertiser server via a mobile communications network, such as the Internet (FIG. 2). The message notification and/or advertisement received at mobile devices 110A, 110B, and 110C may be displayed in a general notifications window of a GUI provided by the operating system of mobile devices 110A, 110B, and 110C. However, it should be noted that the techniques disclosed herein are not limited to push notifications and that these techniques may be applied with any type of messaging scheme or protocol used to deliver message notifications and/or advertisements to mobile devices 110A, 110B, and 110C. It should also be noted that the above implementation incorporating client applications and message notifications is only exemplary and any means can be used to display and deliver the message notification and/or advertisement associated with digital content. In other implementations, the message notification and/or advertisement associated with digital content could be displayed on the mobile device as a scanned picture, part of an email, a text message, and/or a website. After the message notification and/or advertisement is received, digital content may be delivered to the consumer and/or accessed by the consumer, for example, by email, text message, as a "pop-up" web page, as a link to a new web page, through an application on the mobile device, and/or through an application on another device of the mobile device user.

In some implementations, mobile device 110A, 110B, or 110C may be configured to periodically report its current geographic location to one or more of a content server, an advertiser server, a map server, and/or a monitoring server as this location changes over a period of time. Mobile device 110A, 110B, or 110C may also be configured to report its current geographic location to one or more of the content server, the advertiser server, the map server, and/or the monitoring server if the mobile device user accepts and/or acknowledges the receipt of the message notification and/or advertisement. As will be described in further detail below, upon receiving an indication of a new or updated current geographic location of mobile device 110A, 110B, or 110C, the monitoring server may determine whether the updated geographic location is within a geo-fence associated with the digital content. This determination may be made based on stored information identifying the locations and boundaries of various areas associated with the digital content, and/or by accessing the map server to identify locations and boundaries of various areas associated with the digital content.

In an alternative embodiment, the geo-fence-areas 102 or 104 may be setup using a beacon technology standard. A beacon and/or a mobile application running on a mobile device, such as mobile devices 110A, 110B, and 110C, may listen for signals from one or more mobile devices and/or beacons. If a mobile device, such as mobile devices 110A, 110B, and 110C, is within one of the geo-fence-areas 102 or 104 having a beacon, the beacon may determine the mobile device's location, may transmit to a mobile application its location, and/or may deliver digital content to mobile devices detected by the beacon at the location. Beacons may be used to monitor the locations of geo-fence-areas by using Bluetooth Low Energy, 802.11, and/or any other form of wireless data transmission to locate mobile devices. Further, beacons may be used to transmit digital content to one or more mobile devices.

If a monitoring server determines that the geographic location of mobile device 110A, 110B, or 110C is within a geo-fenced area associated with the digital content, e.g., within geo-fenced area 102 or geo-fenced area 104, the monitoring server may provide the content server and/or advertiser server with the current geographic location of the mobile device and may query the content server and/or advertiser server to determine digital content to which access should be granted for one or more of mobile devices 110A, 110B, or 110C. The monitoring server, content server, and/or advertiser server may then send to mobile device 110A, 110B, or 110C one or more of the digital content, a message containing the digital content, access information for accessing the digital content, and/or further actions and/or information required to access the digital content.

As indicated by map 100, the current geographic location of mobile device 110B in this example may not be within a geo-fence associated with the digital, e.g., corresponding to either of geo-fenced areas 102 or 104. Thus, upon determining that mobile device 110B is not currently located within a geo-fence associated with the digital content, a monitoring server, an advertising server and/or a content server may send a message prompting the mobile device user to visit a location associated with the digital content. The advertiser server, content server, monitoring server, and/or map server may also determine which geo-fence associated with the digital content (e.g., geo-fenced areas 102 or 104) is closest to the current location of mobile device 110B and send the mobile device 110B directions to the closer of geo-fence-areas 102 or 104 from the current location of mobile device 110B. Additionally, or alternatively, the advertiser server, content server, and/or monitoring server may use stored information about the mobile device user (e.g. the user's mailing or billing address) to determine the closest geo-fence associated with the digital content, and prompt the mobile device user to visit and/or provide mobile device user with directions to that geo-fence associated with the digital.

FIG. 2 is a block diagram of an exemplary communication system 200 for practicing embodiments of the present disclosure. As shown in FIG. 2, system 200 includes one or more mobile devices 220, such as mobile devices 110A, 110B, and 110C, a content server 230 directly or indirectly connected to a content database 235, an advertiser server 240 directly or indirectly connected to an advertiser database 245, and a map server 250 directly or indirectly connected to a map database 255, and a monitoring server 260 directly or indirectly connected to a monitoring database 265, all of which may be communicatively connected via an electronic communication network 210. The communication system 200 may also include a number of third-party servers (not shown).

Network 210 may be any type of electronic network or combination of networks used for communicating digital content and data between various computing devices. Network 210 may include, for example, a local area network, a medium area network, or a wide area network, such as the Internet. While only a few mobile devices 220 are shown in FIG. 2, system 200 may include any number of mobile devices, such as millions of users' mobile devices. Similarly, while only a content server 230, an advertiser server 240, a map server 250, and a monitoring server 260 are shown in FIG. 2, it should be understood that system 200 may include additional or fewer servers, as desired for a particular implementation. For example, a single server may be provided the combined functions of one or more of the content server 230, the advertiser server 240, the map server 250, and the monitoring server 260. Further, while not shown in FIG. 2, network 210 may include various switches, routers, gateways, or other types of network devices used to facilitate communication between various computing devices via network 210.

In the example shown in FIG. 2, a mobile device 220 may be a laptop, notebook, netbook, or similar type of mobile computing device. A mobile device 220 may be, for example, a tablet device or similar type of mobile device having a touchscreen display, a mobile handset, smartphone, or personal digital assistant ("PDA"). However, it should be noted that each of mobile devices 220 may be any type of mobile computing device configured to send and receive different types of data including, but not limited to, website data, multimedia content, electronic advertisements, and any other type of digital information, over network 210. Examples of such mobile computing devices include, but are not limited to, a laptop computer, a handheld computer, a personal digital assistant (PDA), a cellular telephone, a network appliance, a camera, a smart phone, an enhanced general packet radio service (EGPRS) mobile phone, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen, microphone, camera, keyboard, and/or mouse.

Each of the content server 230, the advertiser server 240, the map server 250, and the monitoring server 260 may be any of various types of servers including, but not limited to, a web server, a proxy server, a network server, or other type of server configured to exchange electronic information with other servers or computing devices via a communication network, e.g., network 210. Such a server may be implemented using any general-purpose computer capable of serving data to other computing devices including, but not limited to, mobile devices 220 or any other computing device (not shown) via network 210. Such a server may include, for example and without limitation, a processor and memory for executing and storing processor-readable instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory, and graphical user interface display. The server may also be implemented using multiple processors and multiple shared or separate memory devices within, for example, a clustered computing environment or server farm.

Also, as shown in FIG. 2, the content server 230, the advertiser server 240, the map server 250, and the monitoring server 260 may be communicatively connected to databases 235, 245, 255, and 265, respectively. Each of databases 235, 245, 255, and 265 may be a data store or memory accessible to the corresponding server and may be implemented using any type of data storage device or recording medium used to store various kinds of data or content. Such data or content may include, for example and without limitation, text or media content that may be later provided to each of mobile devices 220 via network 210.

In an example in which the digital content is delivered and displayed via a client application, the digital content may be stored and/or delivered to the user via the GUI of a client application. It should be noted that this is just an example, and that the digital content in part or in whole can be stored and/or delivered on any electronic medium, including, but not limited to, on the hardware of the mobile device, Internet web servers or websites, and/or by e-mail. Each of the mobile devices 220 may execute a client application that communicates with one or more of the content server 230, the advertiser server 240, the map server 250, and/or the monitoring server 260 via network 210. Further, each of the mobile devices 220 may be configured to receive digital content through an interface and/or application provided by one or more of the content server 230, the advertiser server 240, the map server 250, and/or the monitoring server 260 via network 210.

Content server 230 may be configured to host a web service that provides users with various types of functionality via a GUI of the client application, a web page executable at each of the mobile devices 220, and/or an application for executing content from the content server 230. Such functionality may include, for example and without limitation, providing digital content distributed by an advertiser and/or other content provider. As described above, the digital content sent to each device may be displayed for the mobile device user via a message notifications interface of a mobile operating system at each of the mobile devices 220, in the GUI of a client application, on a webpage, or a text message.

Further, the content server 230 and/or the advertiser server 240 may be configured to communicate with the monitoring server 250, the map server 260, and/or one or more other third-party servers (not shown) to retrieve digital content via network 210 to be displayed in a number of ways to the mobile device user, including, within a content view of a client application executable at each of the mobile devices 220. Further, the content server 230, the advertiser server 240, the map server 250, and/or the monitoring server 260 may each interact with one another, mobile devices 220, and/or any other servers or network devices (not shown) via network 210. Examples of such other servers include, but are not limited to, DNS servers, ad servers, content distribution servers, content distribution networks ("CDNs"), etc.

Advertiser server 240 in this example may be configured to control the transmitting and/or receiving of messages, notifications, advertisements, digital content, and/or access information associated with the digital content depending on the information it receives and on the current location of each of the mobile devices 220. Advertising server 240 may be configured to query the monitoring server 250 via network 210, to determine whether the current location of each of the mobile devices 220 is within a geo-fence associated with the digital content. Advertising server 240 may then be configured to send a request to content server 230 to allow access to digital content for each of the mobile devices 220 determined to be within the geo-fence associated with the digital content. Additionally, or alternatively, advertiser server 240 may provide access information for accessing certain digital content for each of the mobile devices 220 determined to be within the geo-fence associated with the digital content and/or may provide the digital content itself for each of the mobile devices 220 determined to be within the geo-fence.

In some implementations, content server 230, advertiser server 240, monitoring server 250, and/or map server 260 may be implemented as back-end components that interface with only other servers. Thus, it should be noted that for some implementations, advertiser server 240 may be configured to act as an intermediary between monitoring server 250 and map server 260, which might not necessarily have direct communication with any of the mobile devices 220. Accordingly, content server 230, advertiser server 240, monitoring server 250, and/or map server 260 may be configured to exchange information in the form of messages, requests, and/or responses that are passed between the servers. The communication between content server 230, advertiser server 240, monitoring server 250, and/or map server 260 may be over network 210 or a virtual private network accessible to each server. It should be noted that the functions performed by one or more of content server 230, advertiser server 240, monitoring server 250, and/or map server 260, or any combination thereof, as described herein, may be implemented using a single server. Additional features and characteristics of the communication between the mobile devices 220, content server 230, advertiser server 240, monitoring server 250, and/or map server 260 will be described in further detail below with respect to embodiments below.

Figure 3:
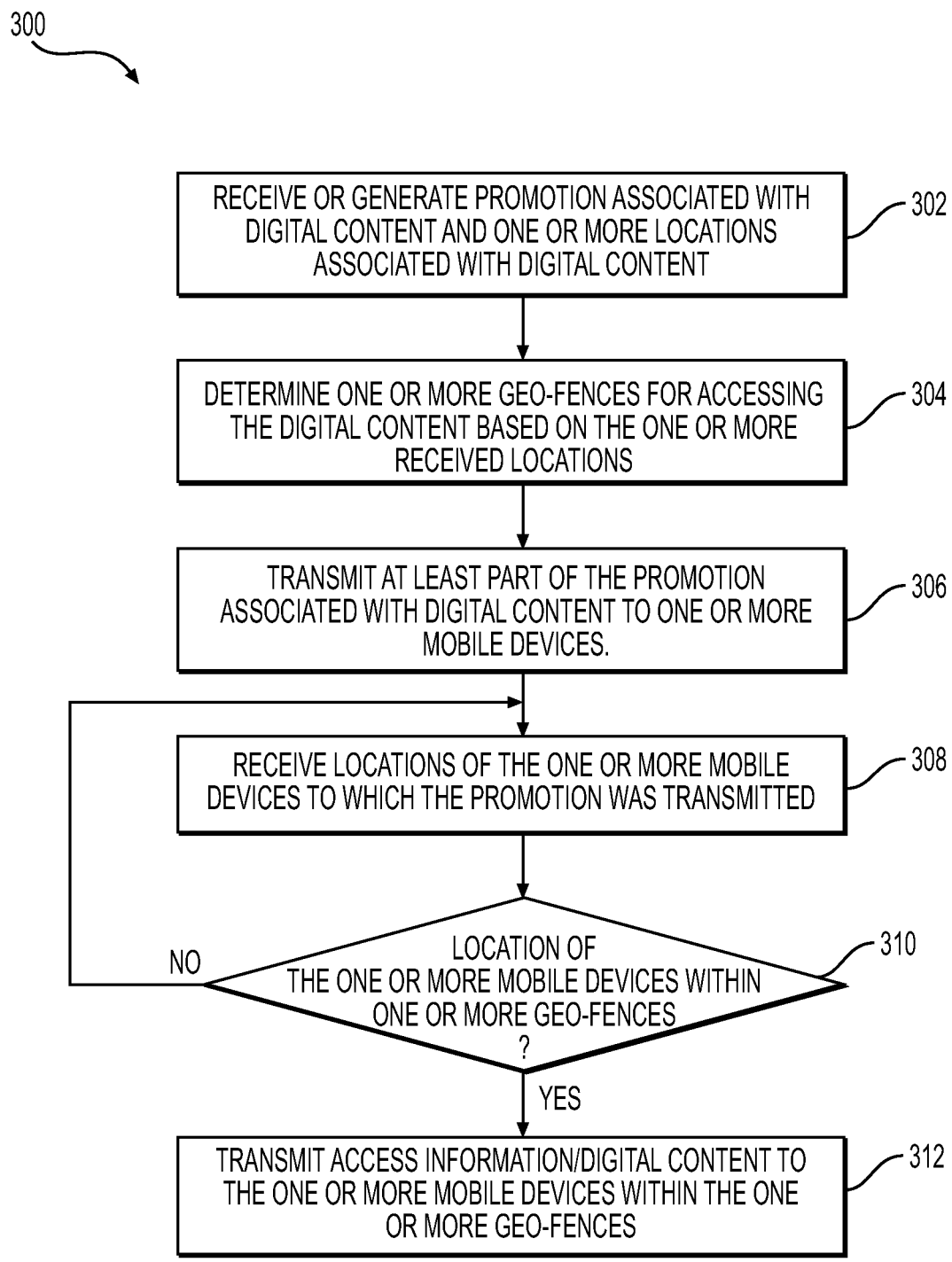
FIGS. 3, 4A, 4B, 5A, 5B, and 6 are block diagrams of exemplary processes for enabling access to digital content based on geographic locations visited by mobile device users.

Referring to FIG. 3, a method 300 is shown for enabling access to digital content based on geographic locations visited by mobile device users. The method 300 is described with reference to components shown in the communication system 200 of FIG. 2, wherein the communication system 200 is preferably configured to perform the method 300 and includes memory for storing instructions for performing the method 300. The method 300 may alternatively be performed via other suitable systems or devices. At step 302, a promotion that is associated with digital content and one or more locations associated with the digital content may be received at one or more servers, such as the content server 230, the advertiser server 240, the map server 250, and/or the monitoring server 260, via a network. The promotion may be a message, a notification, a coupon, a video, an advertisement, and/or any type of digital content, as described herein. Additionally, access information associated with the digital content may also be received by the one or more servers.

One or more geo-fences for accessing the digital content may be determined at step 304. The one or more geo-fences may be based on the one or more locations associated with the digital content. The one or more geo-fences may be a geographic area based on an indication of a physical location received in the form of an address, geographic coordinate, or other suitable location reference. For example, the one or more locations received may be an address, a geographic coordinate, a geo-fence, or other data suitable for determining location from a business and/or advertiser. One or more of the content server 230, the advertiser server 240, the map server 250, and/or the monitoring server 260 may define the one or more geo-fences as a geographic area within a predetermined radius around the geographic coordinate or the address. Alternatively, or additionally, the content server 230, the advertiser server 240, the map server 250, and/or the monitoring server 260 may store dimensional data for buildings in a map database, such as database 255, or may access building dimensional data from a remote system via the network 210 and define the one or more geo-fences as a footprint area of a building or portion of a building corresponding to the received one or more locations, which may be a geographic coordinate or address.

The method 300 may then proceed to step 306 where at least part of the received promotion may be transmitted to one or more mobile devices, such as mobile devices 110A, 110B, and 110C, by one or more servers, such as the content server 230, the advertiser server 240, the map server 250, and/or the monitoring server 260. As mentioned above, the received promotion may be, for example, a notification, a message, a coupon, a video, an advertisement, and/or any type of digital content. The promotion may include one or more instructions for a mobile device user to follow. The instructions may be a list of locations where digital content may be accessed, and/or may include one or more tasks and/or conditions that a user may or must perform to access the digital content. For example, the one or more tasks and/or conditions may be to visit a particular coffee shop and buy an item from the particular coffee shop, go to a particular coffee shop and check-in online (e.g., via a social network), or go to a particular coffee shop and buy a coffee. At step 306, the one or more locations associated with the digital content may also be transmitted to the one or more mobile devices, if desired.

Upon transmitting at least part of the promotion to the one or more mobile devices, the geographic locations of the one or more mobile devices may be received at one or more servers, such as the content server 230, the advertiser server 240, the map server 250, and/or the monitoring server 260. (Step 308). The geographic locations may be received only once, at one or more predetermined intervals, upon sending by the mobile device user, and/or may be continuously received. The one or more predetermined intervals may be any time intervals, such as every second, every minute, every hour, once a day, twice a day, one a week, etc. In some cases, the location detection may be continuous, but the location may only be transmitted or flagged when it intersects with a geo-fence or other location of interest.

The one or more servers, such as the content server 230, the advertiser server 240, the map server 250, and/or the monitoring server 260, at step 310 may determine whether the received geographic location of the one or more mobile devices is within at least one of the one or more geo-fences for accessing the digital content. If the one or more mobile devices are determined to not be within at least one of the one or more geo-fences, the method may return to step 308 to await a time when the geographic locations of the one or more mobile devices intersects with the one or more geo-fences.

When the geographic location of the one or more mobile devices is determined to be within the one or more geo-fences associated with the digital content, at step 312, the one or more servers may transmit access information associated with the digital content to the one or more mobile devices within the one or more geo-fences. Alternative, or additionally, the one or more servers may transmit the digital content to the one or more mobile devices within the one or more geo-fences.

Figure 4A:
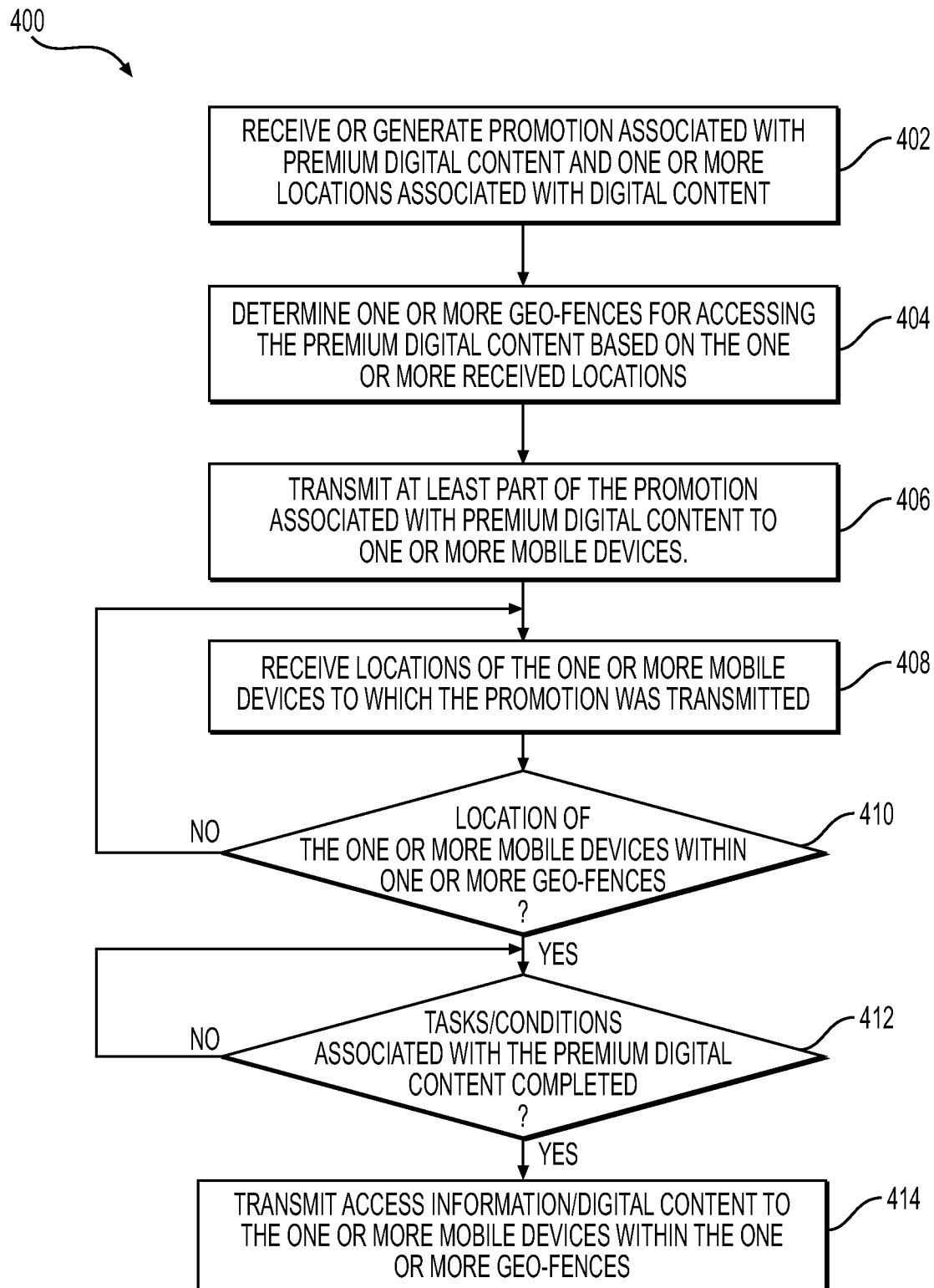
Figure 4B:
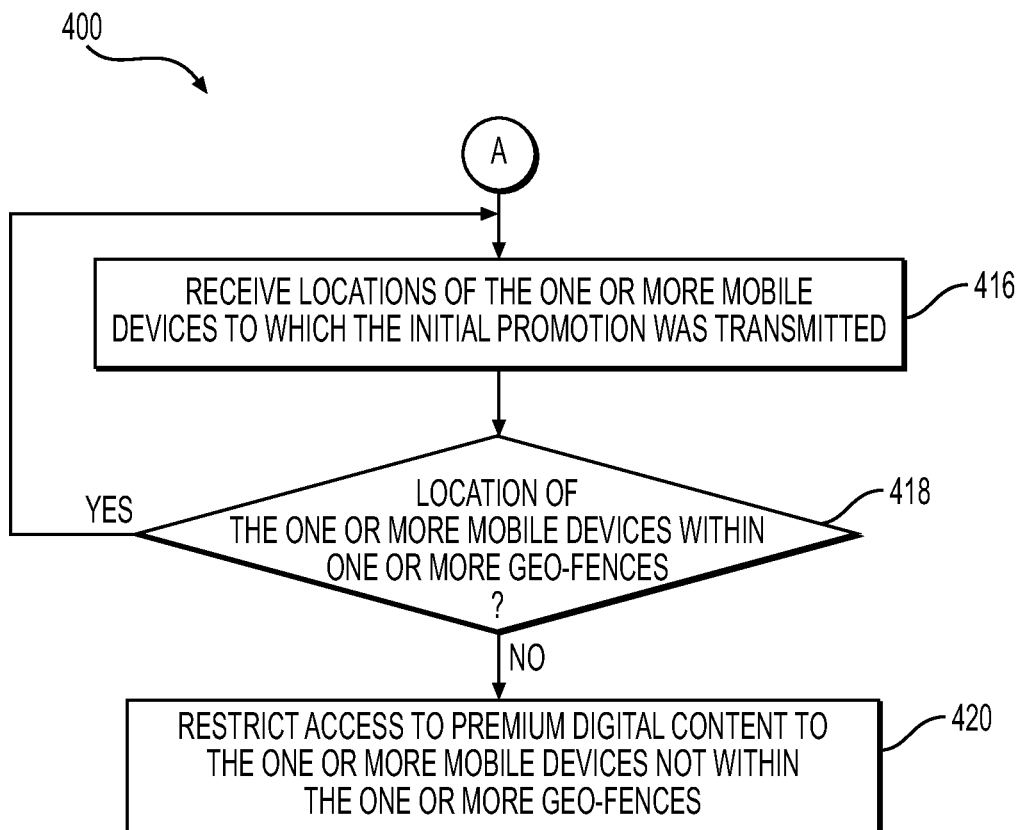

Non-limiting example embodiments of the present disclosure are described in further detail below. In one embodiment of the present disclosure, as shown in FIGS. 4A and 4B, a method 400 is provided for enabling access to digital content based on geographic locations visited by mobile device users. The method 400 is described with reference to components shown in the communication system 200 of FIG. 2, wherein the communication system 200 is preferably configured to perform the method 400 and includes memory for storing instructions for performing the method 400. The method 400 may alternatively be performed via other suitable systems or devices. At step 402, a promotion that is associated with access to premium digital content, and one or more locations associated with the premium digital content may be received at one or more servers, such as the content server 230, the advertiser server 240, the map server 250, and/or the monitoring server 260, via a network. The promotion may include an advertisement, a notification, a message, a coupon, a video, a link, and/or any type of digital content, as described herein. For example, a message may include a list of locations where premium digital content may be accessed. Additionally, access information associated with the premium digital content may also be received by the one or more servers with the advertisement. The access information may include any type of information required to access the premium digital content.

The premium digital content may include restricted access content, and the premium digital content may be associated with free and/or standard digital content that is open access content. For example, the premium digital content may include or be based on premium access to a particular account or membership, such as a LinkedIn Premium account or PandoraOne account, whereas the standard digital content may be a LinkedIn or Pandora "basic" or "standard" account. A mobile device user may have open access to standard digital content, such as a free LinkedIn Basic account that allows for open access to the free standard features of LinkedIn. The premium digital content, such as a LinkedIn Premium account, may have features and/or digital content that are not available (i.e., restricted) in the standard digital content, such as the free LinkedIn Basic account. For example, the premium digital content may be access to Hulu Plus, which offers an expanded digital content library compared to free, standard Hulu, which may be the standard digital content. Additionally, the premium digital content may be unlimited access to the New York Times online, and the standard digital content may be the open content that is freely available online from the New York Times.

The premium digital content may include video game perks. The video game perks may be generated based on unlocking levels, skipping levels, gaining extra features in the game not normally available in the game, gaining extra features in the game early, gaining access to new characters, gaining access to new enemies, etc. Each of these video game perks is associated with a video game that a mobile device user may have on the mobile device, another device of the mobile device user, and/or a video game accessible through the Internet.

In another embodiment of the present disclosure, the premium digital content may be include advertisement-free (ad-free) digital content, and the standard digital content may be a digital content that includes advertisements (so called "freemium" content). For example, the premium digital content may be an application that does not include advertisements when the application is run on a mobile device, such as mobile devices 110A, 110B, or 110C. The standard digital content may be a similar or the same application that also includes advertisements when the application is run on a mobile device.

When the promotion is received at step 402, one or more tasks and/or conditions to complete to access the premium digital content may also be received. The promotion may also include a message about the one or more tasks and/or conditions for the mobile device user to complete to access the premium digital content. The one or more tasks and/or conditions may be any of the tasks and/or conditions described herein.

One or more geo-fences for accessing the premium digital content may be determined at step 404. The one or more geo-fences may be based on the one or more locations associated with the premium digital content. The one or more geo-fences may be a geographic area based on an indication of a physical location received in the form of an address, geographic coordinate, or other suitable location reference, as described above.

The method may then proceed to step 406 where at least part of the received promotion may be transmitted to one or more mobile devices, such as mobile devices 110A, 110B, and 110C, by one or more servers, such as the content server 230, the advertiser server 240, the map server 250, and/or the monitoring server 260. As mentioned above, the received promotion may be a notification, a message, a coupon, a video, and/or any type of digital content. The promotion may include one or more instructions for a mobile device user to follow. The instructions may be a list of locations where premium digital content may be accessed, and/or may include the one or more tasks and/or conditions that a mobile device user may or must perform to access the premium digital content. At step 406, the one or more locations associated with the premium digital content may also be transmitted to the one or more mobile devices, if desired.

Upon transmitting at least part of the promotion to the one or more mobile devices, the geographic locations of the one or more mobile devices may be received at one or more servers, such as the content server 230, the advertiser server 240, the map server 250, and/or the monitoring server 260. (Step 408). The geographic locations may be received only once, at one or more predetermined intervals, upon sending by the mobile device user, and/or may be continuously received. The one or more predetermined intervals may be any time intervals, such as every second, every minute, every hour, once a day, twice a day, one a week, etc.

The one or more servers, such as the content server 230, the advertiser server 240, the map server 250, and/or the monitoring server 260, at step 410 may determine whether the received geographic location of the one or more mobile devices is within at least one of the one or more geo-fences for accessing the premium digital content. If the one or more mobile devices are determined to not be within at least one of the one or more geo-fences, the method proceeds to step 408 to receive the geographic locations of the one or more mobile devices.

If the one or more mobile devices are determined to be within at least one of the one or more geo-fences, the one or more servers may determine if a mobile device user has completed one or more tasks and/or conditions that are required to be completed to access to the premium digital content at step 412. If there are no tasks and/or conditions to complete, or if the mobile device user has completed the one or more tasks and/or conditions that are required, the method 400 proceeds to step 414. If the mobile device user has not completed the one or more required tasks and/or conditions, the method 400 may proceed to step 412. Alternatively, step 412 may occur prior to step 408 and step 410. In another embodiment, step 412 may occur concurrently with step 408 and step 410.

When the geographic location of the one or more mobile devices is determined to be within the one or more geo-fences associated with the premium digital content and the mobile device user has completed one or more required tasks and/or conditions, if any, at step 414, the one or more servers may transmit access information associated with the premium digital content to the one or more mobile devices within the one or more geo-fences. The access information may allow the user to access the premium digital content. Alternatively, or additionally, the one or more servers may transmit the premium digital content to the one or more mobile devices within the one or more geo-fences.

After the access information has been transmitted and/or the premium digital content has been transmitted, the one or more servers may receive the current geographic locations of the one or more mobile devices within the one or more geo-fences at step 416. (FIG. 4B). At step 418, the one or more servers may determine whether the received current geographic location of the one or more mobile devices within the one of the one or more geo-fences remains within the one or more geo-fences. If the one or more mobile devices remain within the one or more geo-fences, the method may proceed to step 416 to receive the current geographic locations of the one or more mobile devices. Additionally, the one or more servers may determine the amount of time that each of the one or more devices has remained within the one or more geo-fences associated with the premium digital content.

If the one or more mobile devices do not remain within (i.e., if they leave) the one or more geo-fences, the method may proceed to step 420. At step 420, the one or more servers may make the premium digital content inaccessible to the one or more mobile devices not remaining within the one or more geo-fences. Additionally, the one or more servers may determine the amount of time that each of the one or more devices was within the one or more geo-fences associated with the premium digital content. If desired, the method may then proceed to step 408 or step 416 to allow the premium digital content to become accessible again.

Figure 5A:
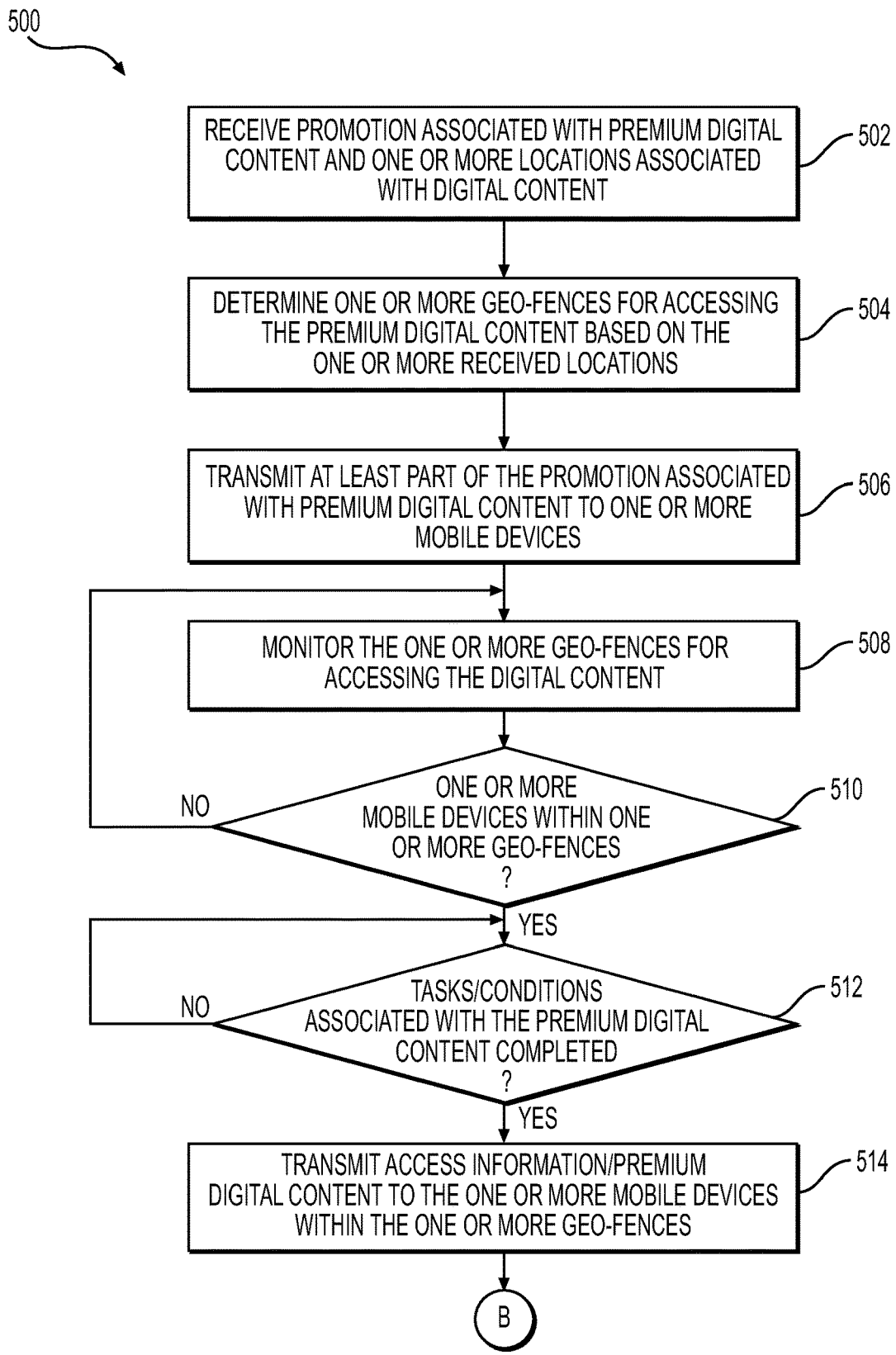
Figure 5B:
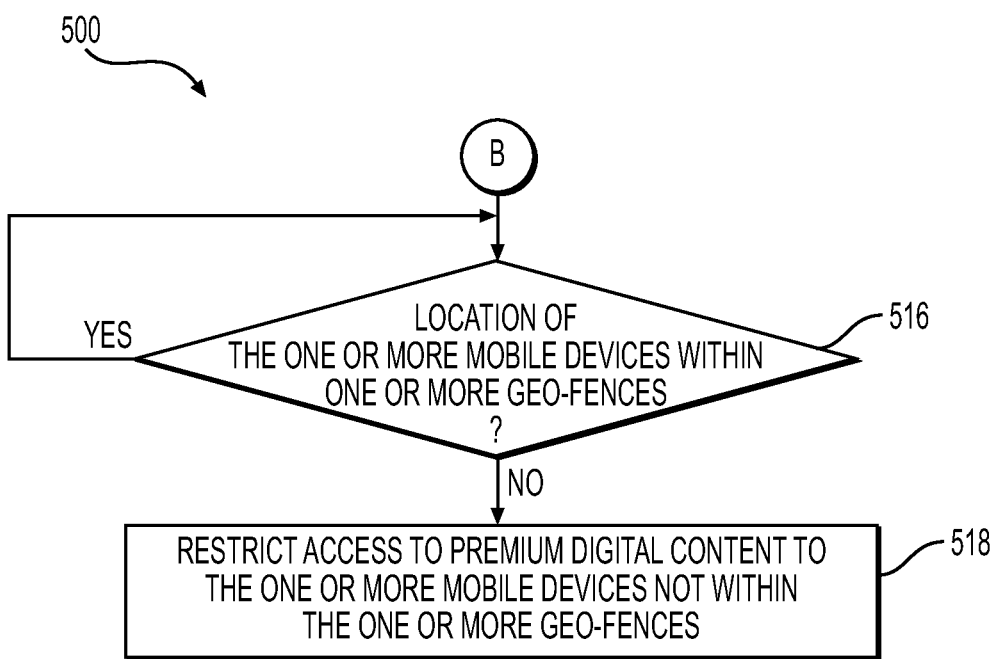

In another embodiment of the present disclosure, as shown in FIGS. 5A and 5B, a method 500 is provided for enabling access to digital content based on geographic locations visited by mobile device users. The method 500 is described with reference to components shown in the communication system 200 of FIG. 2, wherein the communication system 200 is preferably configured to perform the method 500 and includes memory for storing instructions for performing the method 500. The method 500 may alternatively be performed via other suitable systems or devices. At step 502, a promotion that is associated with access to premium digital content, and one or more locations associated with the premium digital content may be received at one or more servers, such as the content server 230, the advertiser server 240, the map server 250, and/or the monitoring server 260, via a network. The access information may include any type of information required to access the premium digital content.

When the promotion is received at step 502, one or more of tasks and/or conditions to complete to access the premium digital content may also be received. The promotion may also include a message about the one or more tasks and/or conditions for the mobile device user to complete to access the premium digital content. The one or more tasks and/or conditions may be any of the tasks and/or conditions described herein.

One or more geo-fences for accessing the premium digital content may be determined at step 504. The one or more geo-fences may be based on the one or more locations associated with the premium digital content. The one or more geo-fences may be a geographic area based on an indication of a physical location received in the form of an address, geographic coordinate, or other suitable location reference, as described above.

The method may then proceed to step 506 where at least part of the received promotion may be transmitted to one or more mobile devices, such as mobile devices 110A, 110B, and 110C, by one or more servers, such as the content server 230, the advertiser server 240, the map server 250, and/or the monitoring server 260. At step 506, the one or more locations associated with the premium digital content may also be transmitted to the one or more mobile devices, if desired.

Upon transmitting at least part of the promotion to the one or more mobile devices, the one or more geo-fences may be monitored by the one or more servers, such as the content server 230, the advertiser server 240, the map server 250, and/or the monitoring server 260. (Step 508).

The one or more servers, such as the content server 230, the advertiser server 240, the map server 250, and/or the monitoring server 260, at step 510 may determine whether the one or more mobile devices are within at least one of the monitored one or more geo-fences for accessing the premium digital content. If the one or more mobile devices are determined to not be within at least one of the monitored one or more geo-fences, the method may proceed to step 510.

If the one or more mobile devices are determined to be within at least one of the monitored one or more geo-fences, the one or more servers may determine if a mobile device user has completed one or more tasks and/or promotions that are required to be completed to access the premium digital content at step 512. If there are no tasks and/or conditions to complete, or if the mobile device user has completed the one or more tasks and/or conditions that are required, the method 500 may proceed to step 514. If the mobile device user has not completed the one or more required tasks and/or conditions, the method 500 may proceed to step 512. Alternatively, step 512 may occur prior to step 508 and step 510. In another embodiment, step 512 may occur concurrently with step 508 and step 510.

When the geographic location of the one or more mobile devices is determined to be within the monitored one or more geo-fences associated with the premium digital content and the mobile device user has completed one or more required tasks and/or conditions, if any, the one or more servers at step 514 may transmit access information associated with the premium digital content to the one or more mobile devices within the monitored one or more geo-fences. The access information may allow the user to access the premium digital content. Alternative, or additionally, the one or more servers may transmit the premium digital content to the one or more mobile devices within the monitored one or more geo-fences.

After the access information has been transmitted and/or the premium digital content has been transmitted, the one or more servers may at step 516 determine whether the one or more mobile devices remains within the one of the monitored one or more geo-fences. (FIG. 5B). Additionally, the one or more servers may determine the amount of time that each of the one or more devices has remained within the one or more geo-fences associated with the premium digital content.

If the one or more mobile devices do not remain within (i.e., they leave) the monitored one or more geo-fences, the method may proceed to step 518. At step 518, the one or more servers may make the premium digital content inaccessible to the one or more mobile devices not remaining within the monitored one or more geo-fences. Additionally, the one or more servers may determine the amount of time that each of the one or more devices was within the monitored one or more geo-fences associated with the premium digital content. If desired, the method may then proceed to step 508 or step 516 to allow the premium digital content to become accessible again.

In an example embodiment, the method 400 and the method 500 may allow a digital content provider to provide access to its premium digital content when a mobile device user is present at a physical location to entice a mobile device user to visit the physical location and to entice the mobile device user to pay for and/or use the premium digital content when not at the one or more physical locations associated with the promotion. Alternatively, a retailer with one or more physical locations may provide a promotion that promotes access to premium digital content to entice mobile device users to one of its locations. Additionally, both the digital content provider and the retailer may work in conjunction with each other to entice mobile device users to pay for the premium digital content and to visit a location of a retailer, based on certain time-based, geographic, and/or demographic interests.

In an example embodiment, the method 300, the method 400 and the method 500 may be implemented by a retailer that desires to entice mobile device users to remain in a location of the retailer. For example, during certain times of day and/or during certain days of the week, locations of a retailer may experience long wait times, such as a Starbucks having a long wait time for coffee at 8:30 am during a weekday. A retailer may want to entice mobile device users to remain in line by proving them with access to digital content and/or premium digital content. In this scenario, the retailer may send one or more tasks and/or conditions with the promotion and the one or more locations associated with the digital content/premium digital content. For example, the conditions may include that a mobile device user must remain in line for at least 5 minutes, that it must be a week day, and that it must be between 8:00 am and 10:00 am, and/or that at least 10 mobile device users must be within the particular location of the retailer. In one example, the digital content transmitted to the mobile device user may be one or more of an e-coupon that provides a discount for an item purchased at the retailer, access to premium online content (e.g., a newspaper), a digital video, and/or a digital song. In addition to providing the digital content, the retailer may also provide the mobile device user with directions to other locations with lower wait times.

In another example embodiment, the method 300, the method 400 and the method 500 may be used by a competitor of a retailer that wants to entice mobile device users to leave a location of the retailer. For example, a competitor of a retailer may want to entice mobile device users to leave a location by providing an e-coupon of the competitor to mobile device users within one or more of the locations of the retailer.

Figure 6:
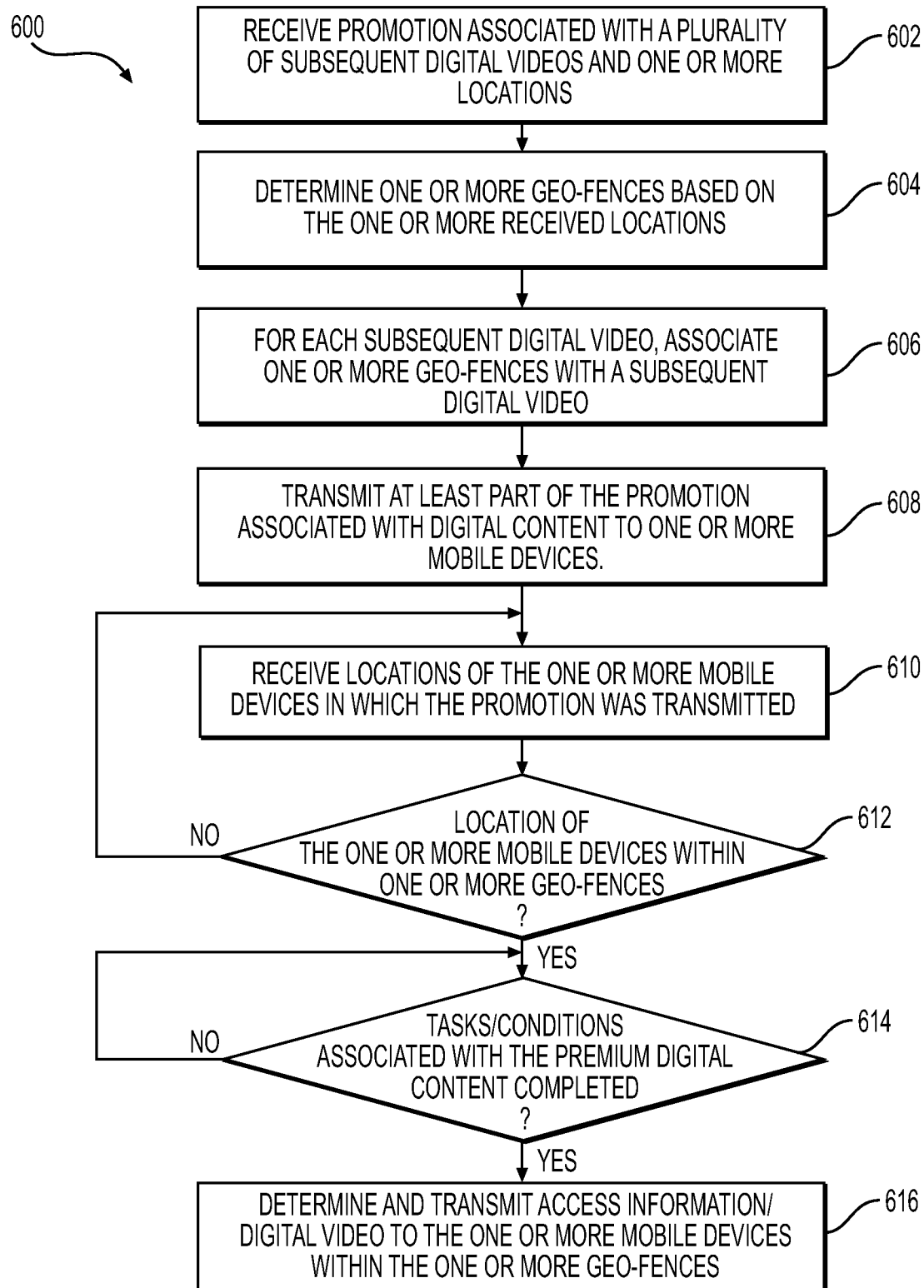

In another embodiment of the present disclosure, as shown in FIG. 6, a method 600 is provided for enabling access to digital content based on geographic locations visited by mobile device users. The method 600 is described with reference to components shown in the communication system 200 of FIG. 2, wherein the communication system 200 is preferably configured to perform the method 600 and includes memory for storing instructions for performing the method 600. The method 600 may alternatively be performed via other suitable systems or devices. At step 602, a promotion may be associated with a plurality of subsequent or alternative digital videos, and a plurality of locations may be received at one or more servers, such as the content server 230, the advertiser server 240, the map server 250, and/or the monitoring server 260, via a network. Each location of the plurality of locations may be associated with a subsequent or alternative digital video of the plurality of subsequent or alternative digital videos.

The promotion may include a digital video, a digital video advertisement, a message, a coupon, a link, and/or any type of digital content. For example, the promotion may be a link to a digital video that is available at a web site. The digital video may have a plurality of different endings associated with it, or a plurality of different alternate cuts, alternate ratings, alternate filters, or any other variations. A mobile device user may watch one or more of these different endings or alternate videos by visiting a location that has been associated with such an ending or alternate video. In certain embodiments, the mobile device user may watch the digital video, and at the end of the video be given a list of locations associated with the various different endings of the digital video. The phrases alternative, alternate, or subsequent digital video should be construed to mean any of a plurality of videos, regardless whether they vary in substance (i.e., as alternate endings or versions) or in form (i.e., in varying quality or format).

When the promotion is received at step 602, one or more tasks and/or conditions to complete to access the subsequent digital video may also be received. The promotion may also include a message about the one or more tasks and/or conditions for the mobile device user to complete to access the subsequent digital video. The one or more tasks and/or conditions may be any of the tasks and/or conditions described herein.

One or more geo-fences for accessing each of the plurality of subsequent digital videos may be determined at step 604. The one or more geo-fences may be based on the one or more locations associated with the plurality of subsequent digital videos. The one or more geo-fences may be a geographic area based on an indication of a physical location received in the form of an address, geographic coordinate, or other suitable location reference, as described above.

At step 606, the one or more servers may associate one of the plurality of subsequent digital videos with each of the one or more geo-fences that the respective digital video is associated with. The one or more servers may randomly associate a geo-fence with a subsequent digital video for all mobile device users and/or the one or more servers may randomly associate a geo-fence with a subsequent digital video each mobile device user in which the promotion is to be transmitted. The one or more servers may associate a geo-fence with a subsequent digital video according to instructions received with the promotion.

The method may then proceed to step 608 where at least part of the received promotion may be transmitted to one or more mobile devices, such as mobile devices 110A, 110B, and 110C, by one or more servers, such as the content server 230, the advertiser server 240, the map server 250, and/or the monitoring server 260. As mentioned above, the received promotion may be a link to the digital video and may include a notification, a message, a coupon, a digital video, and/or any type of digital content. The promotion may include one or more instructions for a mobile device user to follow. The instructions may be a list of locations where each of the subsequent digital videos may be accessed, and/or may include the one or more tasks and/or conditions that a mobile device user may or must perform to access the subsequent digital video. At step 608, the each of the one or more locations associated with a particular subsequent digital video may also be transmitted to the one or more mobile devices, if desired.

Upon transmitting at least part of the promotion to the one or more mobile devices, the geographic locations of the one or more mobile devices may be received at one or more servers, such as the content server 230, the advertiser server 240, the map server 250, and/or the monitoring server 260. (Step 610). The geographic locations may be received only once, at one or more predetermined intervals, upon sending by the mobile device user, and/or may be continuously received. The one or more predetermined intervals may be any time intervals, such as every minute, every hour, once a day, twice a day, one a week, etc.

The one or more servers, such as the content server 230, the advertiser server 240, the map server 250, and/or the monitoring server 260, at step 612 may determine whether the received geographic location of the one or more mobile devices is within at least one of the one or more geo-fences associated with a subsequent digital video. If the one or more mobile devices are determined to not be within at least one of the one or more geo-fences, the method may proceed to step 610 to receive the geographic locations of the one or more mobile devices.

If the one or more mobile devices are determined to be within at least one of the one or more geo-fences, the one or more servers may determine if a mobile device user has completed one or more tasks and/or promotions that are required to be completed to access to the subsequent digital video at step 614. If there are no tasks and/or condition to complete, or if the mobile device user has completed the one or more tasks and/or conditions that are required, the method 600 may proceed to step 616. If the mobile device user has not completed the one or more required tasks and/or conditions, the method 600 may proceed to step 614. Alternatively, step 614 may occur prior to step 610 and step 612. In another embodiment, step 614 may occur concurrently with step 610 and step 612.

When the geographic location of the one or more mobile devices is determined to be within the one or more geo-fences associated with the subsequent digital video and the mobile device user has completed one or more required tasks and/or conditions, if any, at step 616, the one or more servers may determine and transmit access information associated with the subsequent digital video for the particular geo-fence to the one or more mobile devices within the particular geo-fences. The access information may allow the user to access the subsequent digital video. Alternative, or additionally, the one or more servers may determine and transmit the subsequent digital video to the one or more mobile devices within the particular geo-fences.

The method 600 may allow mobile device users to watch different video endings, alternative video cuts/ratings, alternative video qualities/filters, etc. depending on their location. In one embodiment, a promotion may be a digital video that a mobile device user views on a web page. After the digital video plays, the video may be paused and/or stopped. The promotion may provide the mobile device user with a description of the different endings and/or versions, and where the different endings and/or versions are located. For example, if the mobile device user goes to a Starbucks, ending #1 may be watched, and if the mobile device user goes to a McDonald's, ending #2 may be watched. As described in more detail below, retailers may be able to bid on which subsequent digital videos are available at their locations.

For each of the methods, 300, 400, 500, and 600, a notification of entry into the one of more geo-fences of the one or more location maybe transmitted to the one or more mobile devices within the one or more geo-fences. The notification may also provide the mobile device user with the one or more tasks to be completed and/or that have been completed to access the premium digital content. For example, the notification may include the predetermined time that the mobile device user must remain in the location to access the premium digital content.

For each of the above-described methods, the digital content and/or subsequent digital videos may be customized and/or adjusted based on the type of retailer in which content is accessible. For example, a pharmacy store may provide health points as a video game perk, a sandwich shop may provide energy points as a video game perk, a hardware store may provide a tool as a video game perk, a seafood restaurant may provide an "under the sea" level as a video game perk, a steak house may provide a "cowboy" level as a video game perk, and/or a McDonald's may provide a Ronald McDonald playable character as a video game perk.

The digital content and/or subsequent digital videos may be customized and/or adjusted based on the counties, states, and/or countries in which the one or more locations are located. For example, a McDonald's located in Montana may provide a Ronald McDonald a lasso as a video game perk, retail stores in Washington, D.C. may make a video game character may appear as George Washington as a video game perk, retail stores at Starbucks located near Capitol Hill in Washington, D.C. may have a subsequent digital video in which a Washington, D.C. themed ending is accessible.

The digital content and/or subsequent digital videos may be customized and/or adjusted based on a purchase by the mobile device user. For example, if an espresso drink is purchased, a video game perk may be 2 minutes of extra speed, if a double espresso is bought, a video game perk may be 4 minutes of speed, if a protein snack pack is bought, a video game perk may be the ability to destroy walls for 2 minutes, and/or for every $5 spent, a video game perk could give a corresponding number of in game currency.

The digital content and/or subsequent digital videos may be customized and/or adjusted based on an action of the mobile device user. For example, if a mobile device user posts a link to Facebook at a particular location, a subsequent digital video may show an X themed subsequent digital video, or if a mobile device user posts a link to Twitter at the particular location, a subsequent digital video may show a Y themed subsequent digital video. Further, going to a Wal-Mart may earn a video game perk of 5 gems, but if the mobile device user also posts to Facebook while in Wal-Mart, the mobile device user may earn 10 gems as a video game perk.

The digital content and/or subsequent digital videos may be customized and/or adjusted based on loyalty, a number of visits, and/or a frequency of visits. For example, if a mobile device user does not enter a Burger King since the last visit to a McDonald's and/or visits a McDonald's twice in a week, a video game perk may be double the value of in-game currency.

The digital content and/or subsequent/alternate digital videos may be customized and/or adjusted based on the amount of mobile device users in a particular location. For example, if a retail location has little to no mobile device users, the value of the digital content and/or subsequent digital video may be increased to entice mobile device users to the location. The increased value may be more video game perks, higher value e-coupons, and/or more access time to premium digital content.

The digital content and/or subsequent digital videos may be customized and/or adjusted based on the amount of time a mobile device users are within the geo-fence. For example, if a mobile device user remains in the store for 5 minutes, 10 minutes of access time to the New York Times online may be provided.

In yet another embodiment of the present disclosure, access to the digital content and/or the digital content may be restricted. For example, access may be restricted once a mobile device user leaves the one or more geo-fences associated with the digital content. Access may be restricted after a predetermined amount of time. The predetermined amount of time may start from a time the mobile device user enters a geo-fence, from a time a mobile device user leaves a geo-fence, from a time after a mobile device user makes a purchase at the retailer, and/or from a time after the digital content has been accessed.

Access may also be restricted if the mobile device user enters a location of a competitor of the retailer that provided the promotion. For example, access to a new level of a video game may have been permitted when the mobile device user entered a Wal-Mart. Access to the new level may be restricted if the mobile device user enters a Target.

In another embodiment of the present disclosure, one or more server may enable exchanges and/or bidding among digital content providers and retailers with one or more physical location. The one or more servers may receive one or more locations associated with a retailer and receive one or more applications and/or digital content associate with digital content providers.

Each of the retailers and digital content providers may provide and/or request advertisement offers. A buyer may bid on a request for advertisements and/or may pay a preset price. A buyer and sell may share profits, which may be based on foot traffic increases and/or based on increases in use of the digital content. In addition, a retailer and a digital content provider may mutually exchange use of the digital content provider's digital content and advertisement in the one or more locations of the retailer.

For example, a retailer may bid for access to an application or to unlock premium digital content of a digital content provider at specified location. Alternatively, a digital content provider may bid for access to advertise their application or premium digital content may be available at one or more locations of the retailer.

In an embodiment relating to different video endings, retailers may bid to have one or more of their locations to be associated with the most popular ending. The popularity of an ending may be determined by market research and/or after initially testing different endings at locations, randomly. A retailer may also bid to have multiple different endings associated with different locations of the retailer and/or a competitor of the retailer. The retailer may associate which locations receive an ending video at random, and/or use the most popular ending video to drive traffic to a lower performing store.

Figure 7:
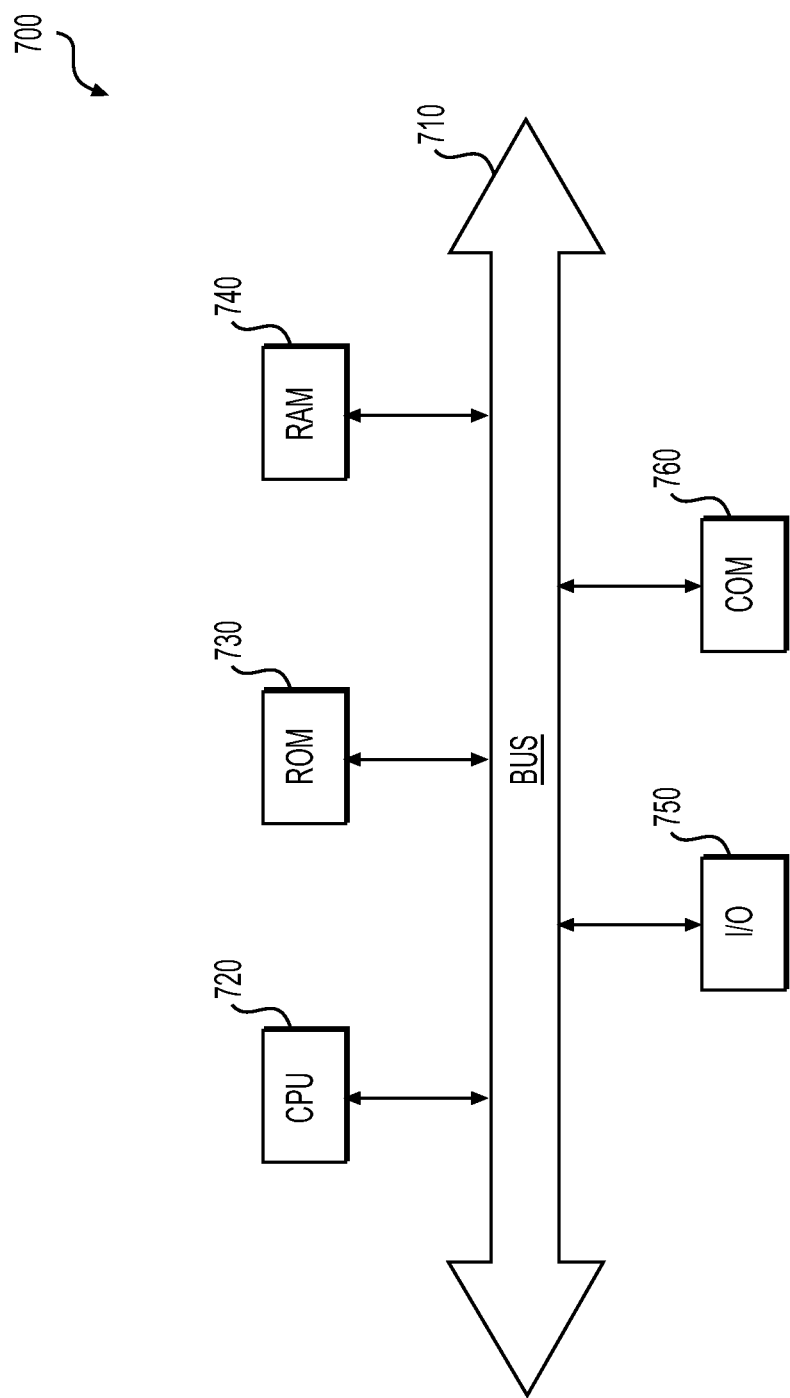
FIG. 7 is a block diagram of an exemplary computer system in which embodiments of the present disclosure may be implemented.

FIG. 7 provides a high-level functional block diagram illustrating an exemplary general-purpose computer 700. Computer 700 may be used to implement, for example, any of content server 230, advertiser server 240, map server 250, and/or monitoring server 260 of FIG. 2, as described above. It is believed that those skilled in the art are familiar with the structure, programming, and general operation of such computer equipment and as a result, the drawings should be self-explanatory.

In an example, computer 700 may represent a computer hardware platform for a server or the like. Accordingly, computer 700 may include, for example, a data communication interface for packet data communication 760. The platform may also include a central processing unit (CPU) 720, in the form of one or more processors, for executing program instructions. The platform typically includes an internal communication bus 710, program storage, and data storage for various data files to be processed and/or communicated by the platform such as ROM 730 and RAM 740, although the computer 700 often receives programming and data via network communications 770. The hardware elements, operating systems, and programming languages of such equipment are conventional in nature, and it is presumed that those skilled in the art are adequately familiar therewith. Computer 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure that fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for enabling access to digital content based on geographic locations visited by a user associated with a mobile device, the method comprising:

receiving, at an advertiser server, a promotion associated with access to premium digital content and access information for the premium digital content, wherein the promotion includes one or more locations in which the premium digital content is accessible, wherein the promotion is associated with one or more tasks for the user to complete, wherein the premium digital content includes restricted access content, and wherein the premium digital content is associated with open access content;

determining, by the advertising server, one or more geofences based on the one or more locations in which the premium digital content is accessible;

transmitting, by the advertiser server, at least part of the promotion to the mobile device;

receiving, at a monitoring server, a geographic location of the mobile device;

determining, by the monitoring server, whether the geographic location of the mobile device is within at least one of the one or more geo-fences;

receiving an indication, at the monitoring server, that the user associated with the mobile device has completed the one or more tasks associated with the promotion;

transmitting by a content server, when the geographic location of the mobile device is determined to be within the one or more geo-fences, access information for the premium digital content to the mobile device within the one or more geo-fences, wherein the access information for the premium digital content is subsequently restricted when the mobile device is determined to be outside the one or more geo-fences; and adjusting the value of the promotion associated with the premium digital content based on i) a determined number of other mobile device users within the one or more geo-fences and ii) on a loyalty program, wherein the loyalty program includes counting a number of visits the mobile device makes to the one or more geo-fences.

2. The method of claim 1, further comprising:

receiving one or more conditions with the promotion that are associated with access to premium digital content, wherein the one or more conditions must be met to access the premium digital content.

3. The method of claim 2, further comprising:
determining whether the one or more conditions are met, wherein transmitting access information for the premium digital content to the mobile device within the one or more geo-fences including transmitting when the geographic location of the mobile device is determined to be within the one or more geo-fences and the one or more conditions are met.

4. The method of claim 1, wherein transmitting at least part of the promotion to the mobile device includes transmitting for display at least part of the promotion to the mobile device via a message notification interface of an operating system of the mobile device.

5. The method of claim 3, wherein upon determining the one or more conditions are met, receiving a geographic location of the mobile device.

6. The method of claim 3, wherein upon determining the geographic location of the mobile device is within the one or more geo-fences, determining whether the one or more conditions are met.

7. The method of claim 1, wherein the geographic location is repeatedly received until the geographic location of the mobile device is determined to be within the one or more geo-fences associated with the premium digital content.

8. The method of claim 1, further comprising:
transmitting, when the geographic location of the mobile device is determined not to be within the one or more geo-fences, a notification for display to the mobile device including a location of one or more geo-fences associated with the premium digital content.

9. The method of claim 8, further comprising:
determining a geo-fence of the one or more geo-fences associated with the premium digital content that is a shortest distance from the geographic location of the mobile device; and
transmitting, for display to the mobile device, directions to the geo-fence of the one or more geo-fences associated with the premium digital content that is the shortest distance from the geographic location of the mobile device.

10. A system for enabling access to digital content based on geographic locations visited by a user associated with a mobile device, the system comprising:
a memory having processor-readable instructions stored therein; and
a processor configured to access the memory and execute the processor-readable instructions, which when executed by the processor configures the processor to perform a plurality of functions, including functions to:
receive, at an advertiser server, a promotion associated with access to premium digital content and access information for the premium digital content, wherein the promotion includes one or more locations in which the premium digital content is accessible, wherein the promotion is associated with one or more tasks for the user to complete, wherein the premium digital content includes restricted access content, and wherein the premium digital content is associated with open access content;
determine, by the advertiser server, one or more geo-fences based on the one or more locations in which the premium digital content is accessible;
transmit, by the advertiser server, at least part of the promotion to the mobile device;
receive, at a monitoring server, a geographic location of the mobile device;
determine, by the monitoring server, whether the geographic location of the mobile device is within at least one of the one or more geo-fences;
receive an indication, at the monitoring server, that the user associated with the mobile device has completed the one or more tasks associated with the promotion;
transmit by a content server, when the geographic location of the mobile device is determined to be within the one or more geo-fences, access information for the premium digital content to the mobile device within the one or more geo-fences, wherein the access information for the premium digital content is subsequently restricted when the mobile device is determined to be outside the one or more geo-fences; and
adjusting the value of the promotion associated with the premium digital content based on i) a determined number of other mobile device users within the one or more geo-fences and ii) on a loyalty program, wherein the loyalty program includes counting a number of visits the mobile device makes to the one or more geo-fences.

11. The system of claim 10, wherein the processor configured to access the memory and execute the processor-readable instructions further includes functions to:
receive one or more conditions with the promotion that are associated with access to premium digital content, wherein the one or more conditions must be met to access the premium digital content.

12. The system of claim 11, wherein the processor configured to access the memory and execute the processor-readable instructions further includes functions to:
determine whether the one or more conditions are met, wherein transmitting access information for the premium digital content to the one or more mobile devices within the one or more geo-fences including transmitting when the geographic location of the one or more mobile devices is determined to be within the one or more geo-fences and the one or more conditions are met.

13. The system of claim 11, wherein the function to transmit at least part of the promotion to the mobile device includes the function to transmit for display at least part of the promotion to the mobile device via a message notification interface of an operating system of the mobile device.

14. The system of claim 12, wherein the processor configured to access the memory and execute the processor-readable instructions further includes functions to:
upon determining the one or more conditions are met, perform the function to receive a geographic location of the mobile device.

15. The system of claim 12, wherein, the processor configured to access the memory and execute the processor-readable instructions further includes functions to:
upon determining the geographic location of the mobile device is within the one or more geo-fences, perform the function to determine whether the one or more conditions are met.

16. The system of claim 10, wherein the function to receive a geographic location of the mobile device is repeated until the geographic location of the mobile device is determined to be within the one or more geo-fences associated with the premium digital content.

17. The system of claim 11, wherein the processor configured to access the memory and execute the processor-readable instructions further includes functions to:
   transmit, when the geographic location of the mobile device is determined not to be within the one or more geo-fences, a notification for display to the mobile device including a location of one or more geo-fences associated with the premium digital content.

18. The system of claim 17, wherein the processor configured to access the memory and execute the processor-readable instructions further includes functions to:
   determine a geo-fence of the one or more geo-fences associated with the premium digital content that is a shortest distance from the geographic location of the mobile device; and
   transmit, for display to the mobile device, directions to the geo-fence of the one or more geo-fences associated with the premium digital content that is the shortest distance from the geographic location of the mobile device.

19. A computer readable medium for enabling access to digital content based on geographic locations visited by a user associated with a mobile device that stores instructions that, when executed by a computer, cause the computer to perform functions to:
   receive, at an advertiser server, a promotion associated with access to premium digital content and access information for the premium digital content, wherein the promotion includes one or more locations in which the premium digital content is accessible, wherein the promotion is associated with one or more tasks for the user to complete, wherein the premium digital content includes restricted access content, and wherein the premium digital content is associated with open access content;
   determine, by the advertiser server, one or more geo-fences based on the one or more locations in which the premium digital content is accessible;
   transmit, by the advertiser server, at least part of the promotion to the mobile device;
   receive, at a monitoring server, a geographic location of the mobile device;
   determine, by the monitoring server, whether the geographic location of the mobile device is within at least one of the one or more geo-fences;
   receive an indication, at the monitoring server, that the user associated with the mobile device has completed the one or more tasks associated with the promotion;
   transmit by a content server, when the geographic location of the mobile device is determined to be within the one or more geo-fences, access information for the premium digital content to the mobile device within the one or more geo-fences, wherein the access information for the premium digital content is subsequently restricted when the mobile device is determined to be outside the one or more geo-fences; and
   adjusting the value of the promotion associated with the premium digital content based on i) a determined number of other mobile device users within the one or more geo-fences and ii) on a loyalty program, wherein the loyalty program includes counting a number of visits the mobile device makes to the one or more geo-fences.

20. The computer readable medium of claim 19 further stores instructions that, when executed by a computer, cause the computer to perform functions to:
   receive one or more conditions with the promotion that are associated with access to premium digital content, wherein the one or more conditions must be met to access the premium digital content.

* * * * *